United States Patent [19]

Walters

[11] Patent Number: 5,310,771
[45] Date of Patent: May 10, 1994

[54] POLYOLEFIN STABILIZATION

[75] Inventor: John P. Walters, Greer, S.C.

[73] Assignee: Phillips Petroleum Company, Bartlesville, Okla.

[21] Appl. No.: 872,863

[22] Filed: Apr. 23, 1992

[51] Int. Cl.$^5$ ............................................. C08K 5/5317
[52] U.S. Cl. ................................. 524/100; 524/102; 524/103; 524/131
[58] Field of Search ................ 524/100, 102, 103, 131

[56] References Cited

U.S. PATENT DOCUMENTS

| | | | |
|---|---|---|---|
| 3,310,575 | 3/1967 | Spivack | 524/132 |
| 4,291,093 | 9/1981 | Wishman et al. | 428/379 |
| 4,377,651 | 3/1983 | Leininger | 524/101 |
| 4,629,752 | 12/1986 | Layer | 524/100 |
| 4,710,527 | 12/1987 | Nelson et al. | 524/100 |
| 5,047,460 | 9/1991 | Kletecka et al. | 524/100 |
| 5,049,600 | 9/1991 | Kletecka | 524/180 |
| 5,098,944 | 3/1992 | Kletecka et al. | 524/100 |

OTHER PUBLICATIONS

D. J. Carlsson and D. M. Wiles–J. Polymer Science: Polymer Chem. Edition vol. 12, 2217–2233 (1974).

Primary Examiner—Veronica P. Hoke
Attorney, Agent, or Firm—Marianne H. Michel

[57] ABSTRACT

Homopolymers and copolymers of 1-olefins are stabilized against the effects of ultraviolet light degradation by contacting a polyolefin, a hindered amine, and a metal phosphonate. Optionally the stabilizing system contains a phenolic antioxidant, an organic phosphite, and a colorant.

24 Claims, No Drawings

POLYOLEFIN STABILIZATION

BACKGROUND OF THE INVENTION

This invention relates to polyolefin stabilization.

The importance of protecting 1-olefin polymers against the degradative effects of oxygen, heat and sunlight is well-known. Numerous additives have been found to be effective, to varying degrees, for certain polymer compositions. Pigmented fibers are of particular concern under exposure to ultraviolet radiation, and often degrade very quickly.

SUMMARY OF THE INVENTION

Accordingly, an object of this invention is to provide an ultraviolet light stabilizing system for polyolefins.

Another object of this invention is to provide an ultraviolet light stabilizing system for pigmented polyolefins.

In accordance with the present invention, there is provided a polyolefin composition stabilized against the effects of ultraviolet light degradation comprising a polyolefin, a hindered amine, and a metal phosphonate. Optionally the stabilizing system contains a phenolic antioxidant, an organic phosphite, and a colorant.

DETAILED DESCRIPTION OF THE INVENTION

The term "polyolefin" as used herein is intended to include the normally solid homopolymers and co- and terpolymers of aliphatic 1-oleins having from 2 to about 10 carbon atoms per molecule and blends thereof. Specific examples include polyethylene, polypropylene, poly(1-butene), copolymers of ethylene/propylene, ethylene/1-hexene, ethylene/1-decene, propylene/ethylene, and propylene/ethylene/1-butene. Presently preferred polymers include polypropylene and propylene/1-olefin copolymers containing at least about 90 mole % propylene and from about 0.1 to about 10 mole % of a 1-olefin comonomer, particularly ethylene. Processes for preparing the polymers are well-known, e.g. U.S. Pat. No. 2,825,725 which issued Mar. 26, 1956, to Hogan et al and U.S. Pat. No. 3,502,632 which issued Mar. 24, 1970 to Stedefeder et al.

Hindered amine compounds that can be used according to the invention include substituted mono-melamines, substituted di-melamines, substituted tri-melamines, and ether-substituted dipiperidinyl malonates. Melamine is defined as 1,3,5-triamino-2,4,6-triazine. The hindered amine compounds can be represented by the following formulas.

Hindered amine compounds of the substituted mono-melamine type can be represented by the formula I:

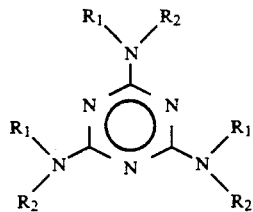

wherein
R$_1$ is hydrogen, an alkyl group preferably containing 1 to 6 carbon atoms, or a cycloalkyl group preferably containing 3 to 12 carbon atoms. Examples of R$_1$ include hydrogen, methyl, ethyl, 1-propyl, 1-hexyl, cyclobutyl, cyclohexyl, and cyclodecyl. Cyclohexyl is preferred.

R$_2$ is a 1-alkylene piperazinone and can be represented by the formula A:

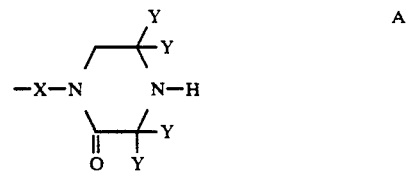

wherein X is an alkylene group containing 1 to 6 carbon atoms. Examples of X include methylene, ethylene, propylene, trimethylene, tetramethylene, and 1,1-dimethylethylene. Ethylene and propylene are preferred. Y is an alkyl group containing 1 to 6 carbon atoms. Examples of Y include methyl, ethyl, propyl, and hexyl groups. Methyl is preferred.

Currently preferred compounds are:
where R$_1$ is cyclohexyl,
R$_2$ is represented by formula A where X is ethylene and Y is methyl, also described as 2-(3,3,5,5-tetramethylpiperazinone)ethylene) (GR-3150 from B. F. Goodrich Co.) herein designated HA2; and
where R$_1$ is cyclohexyl,
2 is represented by formula A where X is propylene and Y is methyl, also described as 3-(3,3,5,5-tetramethylpiperazinone)propylene) (CS-6629 from B. F. Goodrich Co.) herein designated HA3.

The above specific examples of preferred hindered amine stabilizers of the formula I type can also be described as follows:
2,4,6-tri(N-cyclohexyl-N-(2-(3,3,5,5-tetramethylpiperazinone)ethylene))-s-triazine (GR-3150 from B. F. Goodrich Co.) HA2; and
2,4,6-tri(N-cyclohexyl-N-(3-(3,3,5,5-tetramethylpiperazinone)propylene))-s-triazine (CS-6629 from B. F. Goodrich Co.) HA3.

Hindered amines of the substituted di-melamine type (alternately described as substituted 1,4-di(triazine) piperazine compounds) can be represented by the formula II:

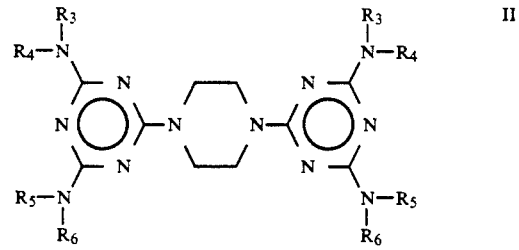

wherein
R$_3$ is hydrogen, an alkyl group containing 1 to 10 carbon atoms, or a cycloalkyl group containing 3 to 12 carbon atoms. Examples of R$_3$ groups include methyl, ethyl, 1-propyl, 1-hexyl, cyclobutyl, cyclohexyl, and cyclodecyl. Hydrogen, 1-propyl, 1-octyl and cyclohexyl groups are preferred;

R$_4$ is a 1-alkylene piperazinone and can be represented by formula A above. Wherein X is an alkylene group containing 1 to 6 carbon atoms. Examples of X include methylene, ethylene, propylene, trimethylene, tetramethylene, and 1,1-dimethylethylene. The preferred alkylene group is 1,1-dimethylethylene. Wherein Y is an alkyl group containing 1 to 6 carbon atoms. Examples of Y include methyl, ethyl, propyl, and hexyl groups. Methyl is preferred;

$R_5$ and $R_6$ are alkyl groups containing 1 to 6 carbon atoms or cycloalkyl groups containing 3 to 12 carbon atoms. The groups can be the same or different, or taken together to form a single heterocyclic group containing 4 to 9 carbon atoms. Ethyl, 1-butyl, and cyclhexyl groups are preferred when $R_5$ and $R_6$ are taken individually. When $R_5$ and $R_6$ are taken together 1-pyrrolidinyl or 1-piperidinyl groups are formed. Preferred compounds are 1-piperidinyl groups.

Specific examples of preferred hindered amine stabilizers represented by formula II are:
where $R_3$ is cyclohexyl,
  $R_4$ is represented by formula A where X is propylene and Y is methyl, also described as 3-(3,3,5,5-tetramethylpiperazinone)propylene, and
  Rhd 5 and $R_6$ are individual n-butyl groups (CS-7030 from B. F. Goodrich Go.) herein designated HA4;
where $R_3$ is hydrogen,
  $R_4$ is represented by formula A where X is 1,1-dimethylethylene and Y is methyl, also described as 2-(3,3,5,5-tetramethylpiperazinone)1,1-dimethylethylene; and
  $R_5$ and $R_6$ taken together are 1-piperidinyl (CS-7417 from B. F. Goodrich Co.) herein designated HA5;
where $R_3$ is hydrogen,
  $R_4$ is represented by formula A where X is 1,1-dimethylethylene and Y is methyl, also described as 2-(3,3,5,5-tetramethylpiperazinone)1,1-dimethylethylene; and
  $R_5$ and $R_6$ are individual n-butyl groups (CS-7422 from B. F. Goodrich Co.) herein designated HA6;
where $R_3$ is 2-octyl,
  $R_4$ is represented by formula A where X is ethylene and Y is methyl, also described as 2-(3,3,5,5-tetramethylpiperazinone)ethylene; and
  $R_5$ and $R_6$ are individual cyclohexyl groups (CS-7439 from B. F. Goodrich Co.) herein designated HA8;
where $R_3$ is hydrogen,
  $R_4$ is represented by formula A where X is 1.1-dimethylethylene and Y is methyl, also described as 2-(3,3,5,5-tetramethylpiperazinone)1,1-dimethylethylene;
  $R_5$ is cyclohexyl; and
  $R_6$ is ethyl (GR-X41 from B. F. Goodrich Co.) herein designated HA10;
where $R_3$ is 2-propyl,
  $R_4$ is represented by formula A where X is ethylene and Y is methyl, also described as 2-(3,3,5,5-tetramethylpiperazinone)ethylene; and
  $R_5$ and $R_6$ individually are n-butyl groups (GR-X153 from B. F. Goodrich Co.) herein designated HA11.

HA11 (GR-X153 from B. F. Goodrich) can also be described as [4,4'-bis(2,2'-bis(N,N-dipropylamino)-6,6'-bis(N-(2-propyl)-N-(2-(3,3,5,5-tetramethyl piperizinone ethyl) s-triazine]1,4-piperazine.

Hindered amines of the substituted tri-melamine type can be represented by the formula III:

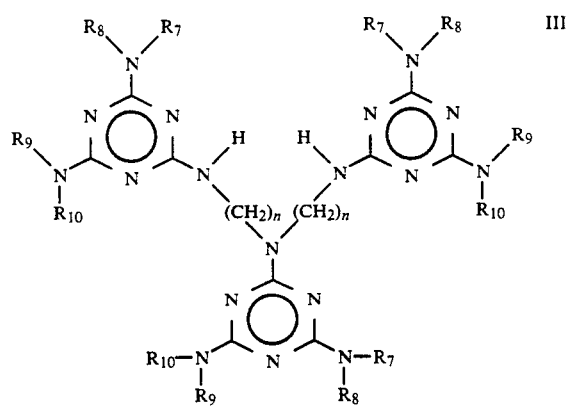

wherein
  n is 1 to 4, preferably 2 or 3;
  $R_7$, $R_8$, $R_9$, and $R_{10}$ can be the same or different and are hydrogen, alkyl groups containing 1 to 10 carbon atoms, cycloalkyl groups containing 3 to 12 carbon atoms, and at least one R group is a 1-alkylene piperazinone represented by formula A above, wherein X is an alkylene group containing 1 to 6 carbon atoms. Examples of X include methylene, ethylene, propylene, trimethylene, tetramethylene, and 1,1-dimethylethylene. The preferred groups are ethylene and 1,1-dimethylethylene. Y is an alkyl group containing 1 to 6 carbon atoms. Examples of Y include methyl, ethyl, propyl, and hexyl groups. Methyl is preferred.

Examples of suitable alkyl and cycloalkyl R groups include methyl, ethyl, 1-propyl, 1-hexyl, 1-octyl, cyclohexyl, and cyclodecyl.

Specific examples of preferred hindered amine stabilizers of the substituted tri-melamine type represented by formula III include:
where n=3,
  $R_7$, $R_8$, and $R_9$ are cyclohexyl; and
  $R_{10}$ is represented by formula A where X is ethylene and Y is methyl, also described as 2-(3,3,5,5-tetramethylpiperazinone)ethylene, (CS-7438 from B. F. Goodrich Co.) herein designated HA7; and
where n=2,
  $R_7$ is hydrogen;
  $R_8$ is cyclohexyl;
  $R_9$ is represented by formula A where X is 1,1-dimethylethylene and Y is methyl, also described as 2-(3,3,5,5-tetramethylpiperazinone)1,1-dimethylethylene; and
  $R_{10}$ is hydrogen, (GR-X134 from B. F. Goodrich) herein designated HA9.

The above specific examples of preferred hindered amine stabilizers of the type represented by formula III can also be described as follows:
1,5,9-tri(6-(2-cyctohexylamine)-4-(1,1-dimethyl-3(3,3,5,5-tetramethylpiperidyl)) propylamino-s-triazine)1,5,9-triazanonane (CS-7438 from B. F. Goodrich) HA7; and
1,4,7-tri-(6-(2-cyclohexylamine)-4-(1,1-dimethyl-2(3,3,5,5-tetramethylpiperidyl)) ethylamino-s-triazine)1,4,7-triazaheptane (GR-X134 from B. F. Goodrich) HA9.

Hindered amine compounds of the ether-substituted dipiperidinyl malonate type can be represented by the formula IV:

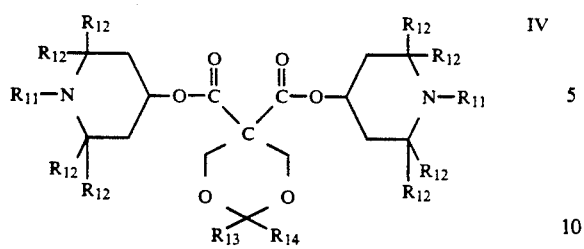

wherein
- $R_{11}$ is hydrogen or an alkyl group containing 1 to 6 carbon atoms. Examples of suitable $R_{11}$ groups include hydrogen, methyl, ethyl, 1-propyl, and 1-hexyl. Hydrogen is preferred;
- $R_{12}$ is an alkyl having from 1 to 6 carbon atoms. Examples of $R_{12}$ groups include methyl, ethyl, 1-propyl, and 1-hexyl. Hydrogen and methyl are preferred;
- $R_{13}$ and $R_{14}$ are the same or different, and are hydrogen, alkyl groups having from 1 to 12 carbon atoms, or alkylene groups containing 1 to 10 carbon atoms joining two substituted ether dipiperidinyl malonates of the structure IV, or taken together to form a single cycloalkyl or heterocyclic group containing 3 to 20 carbon atoms. Examples of suitable $R_{13}$ and $R_{14}$ groups include hydrogen, 2-butyl, 3-heptyl, 2-octyl, methylene, ethylene, trimethylene, and pentamethylene. Preferred groups where $R_{13}$ and $R_{14}$ are taken together are cyclopentyl, cyclohexyl, and 2,2,6,6-tetramethyl-4-piperidinyl groups.

Specific examples of preferred hindered amine stabilizers of the ether-substituted dipiperidinyl malonate type represented by formula IV are:

where $R_{11}$ is hydrogen,
$R_{12}$ is methyl; and
$R_{13}$ and $R_{14}$ taken together form cyclohexyl (Topanex 500H from ICI) herein designated HA12;

where $R_{11}$ is hydrogen,
$R_{12}$ is methyl; and
$R_{13}$ and $R_{14}$ taken together form 2,2,6,6,-tetramethyl-4-piperidinyl (4650-104 from ICI) herein designated HA13;

where $R_{11}$ is hydrogen,
$R_{12}$ is methyl;
$R_{13}$ is hydrogen; and
$R_{14}$ is a trimethylene group connecting two ether-substituted dipiperidinyl malonate groups (6218-004 from ICI) herein designated HA14;

where $R_{11}$ is hydrogen,
$R_{12}$ is methyl;
$R_{13}$ is hydrogen; and
$R_{14}$ 3-heptyl (6305-121 from ICI) herein designated HA15.

$R_{13}$ and $R_{14}$ in the above specific examples can be represented by the following formulas:

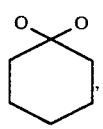
HA12

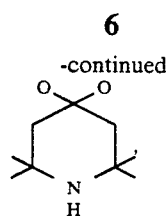
HA13

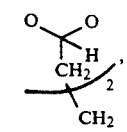
HA14 and

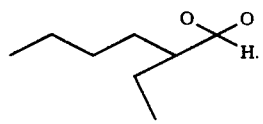
HA15

Some hindered amines did not exhibit a synergistic effect as ultraviolet stabilizers in polypropylene, when used in combination with metal phosphonates. Polymelamine compounds substituted with piperidinyl groups have been found to be ineffective in improving the light stabilization of polypropylene fiber when combined with metal phosphonates. Examples of these compounds include Chimassorb 119 FL from Ciba Geigy Corp. herein designated HA1, Chimassorb 944 from Ciba Geigy Corp. herein designated HA17, and Cyasorb UV-3346 from American Cyanamid Co. herein designated HA18.

Chimasorb 944 from Ciba-Geigy, herein designated HA17, is N-N'-bis(2,2,6,6,-tetramethyl-4-piperidinyl-)-1,6-hexanediamine, polymer with 2,4,6-trichloro-1,3,5-triazine and 2,4,4-trimethyl-1,2-pentanamine.

The metal phosphonate can be represented by the formula V:

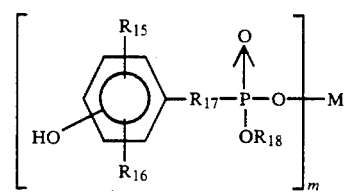

wherein
- m is 1, 2, or 3;
- $R_{15}$ is an alkyl group having from 1 to 6 carbon atoms;
- $R_{16}$ is hydrogen or an alkyl having from 1 to 6 carbon atoms;
- $R_{17}$ is an alkylene radical having from 1 to 4 carbon atoms;
- $R_{18}$ is hydrogen or alkyl having from 1 to 30 carbon atoms; and
- M is a metal selected from among aluminum, barium, cadmium, calcium, chromium, cobalt, nickel, sodium, tin, and zinc.

Of the metals, nickel and calcium are presently preferred. Nickel is preferred because of its effectiveness with most types of hindered amines. Calcium is preferred for environmental considerations and effectiveness with hindered amines of the substituted monomelamine and ether-substituted dipiperidinyl malonate types.

Specific metal phosphonate compounds that can be used according to the invention include:

nickel bis(O-ethyl-3,5,-di-t-butyl-4-hydroxybenzylphosphonate);

cobalt bis(O-n-octadecyl-3,5-di-t-hexyl-4-hydroxybenzylphosphonate);

barium bis(O-triacontyl(3,5-di-t-pentyl-4-hydroxyphenyl)propylphosphonate);

calcium bis(O-methyl(3,5-di-t-butyl-4-hydroxybenzyl)butylphosphonate);

aluminum tris(O-n-butyl-3,5-di-t-butyl-4-hydroxybenzylphosphonate;

sodium (O-dodecyl-(3-t-butyl-4-hydroxyphenyl)ethylphosphonate);

zinc 3,5-di-t-butyl-4-hydroxybenzylphosphonate;

chromium tris(O-n-hexyl-3,5-di-t-butyl-4-hydroxybenzylphosphonate;

cadmium bis(O-octadecyl-3-methyl-4-hydroxy-5-t-butyl-benzylphosphonate); and tin bis(O-n-butyl-3,5-di-t-butyl-4-hydroxybenzylphosphonate); and mixtures thereof.

Especially preferred compounds are nickel bis(O-ethyl-3,5,-di-t-butyl-4-hydroxybenzylphosphonate) (Irgastab 2002 from Ciba-Geigy) herein designate MP1 and calcium bis(O-ethyl-3,5,-di-t-butyl-4-hydroxybenzylphosphonate) (Irganox 1425 from Ciba-Geigy) herein designated MP2.

In a presently preferred embodiment, the stabilized compositions of this invention can be admixed with a phenolic beat stabilizer and optionally a colorant(s) and/or an organic phosphite.

The phenolic heat stabilizer that can be used according to the invention is preferably a hydroxyphenylalkenyl isocyanurate. Especially preferred is tris-(3,5-di-t-butyl-4-hydroxybenzyl)isocyanurate [Irganox 3114 from Ciba-Geigy]. The isocyanurates are more fully described in U.S. Pat. No. 3,531,483 which issued Sep. 29, 1970 to J. C. Gilles. However, other conventional heat stabilizers such as 2,6-di-t-butyl-4-methylphenol (BHT), n-octadecyl[3-(3,5-di-t-butyl-4-hydroxybenzyl)]propionate, di-n-octadecyl(3,5-di-t-butyl-4-hydroxybenzyl) phosphonate, tetrakis[methylene(3,5-di-t-butyl-4-hydroxyhydrocinnamate)methane, and 2,4,6-tris(3,5-di-t-butyl-4-hydroxybenzyl)benzene, and mixtures thereof, can also be employed.

Suitable organic phosphites, when used, include aryl phosphites such as tris(nonylphenyl)-phosphite, tris(2,4-di-t-butylphenyl) phosphite, alkyl phosphites such as trioctyl phosphite, and dilauryl phosphite. More preferably, the organic phosphite is a diphosphite such as the pentaerythritol derivatives disclosed in U.S. Pat. No. 3,047,608 which issued Jul. 31, 1962, to Friedman et al and 3,053,873 which issued Sep. 11, 1962, to Friedman et al. Particularly preferred compounds are 3,9-di(octadecyloxy)-2,4,8,10-tetraoxy-3,9-diphosphaspiro[5,-5]undecane, more commonly known as distearyl pentaerythritol diphosphite and bis(2,4-di-t-butylphenyl)pentaerythritol diphosphite/0.5-1.2 percent triisopropanolamine [Ultranox 626 from GE].

Suitable colorants, when used, include those having sufficient thermal stability to be conventionally employed with polyolefins and can be of inorganic or organic nature. Mixtures can be used. Such colorants are commercially available in powder and concentrate form and can include for example, titanium dioxide, carbon black, cadmium sulfide, phthalocyanine green, phthalocyanine blue, ultramarine blue, and chelating dyestuffs, including those described in U.S. Pat. No. 3,357,783 which issued Dec. 12, 1967, to Wunderlich et al. Fiber with phthalocyanine blue pigmentation is particularly susceptible to degradation by ultraviolet radiation and the inventive stabilizing system is especially effective with these pigments. The inventive stabilizing system is effective with orange, red, brown, green, blue, violet, and gray pigments, with the greatest increases in stabilization in the blue and violet pigments.

Other suitable additives can be included in the formulations of the invention providing the improved results of this invention are not adversely affected. These additives include fillers, antistatic agents, lubricating or processing agents such as calcium stearate.

Each stabilizer is used in an amount effective to provide stabilization. The hindered amine and the metal phosphonate each can be employed in an amount ranging from about 0.05 to about 5 weight percent based on the weight of the total composition, preferably from 0.05 to 2 weight percent. The weight ratio of the hindered amine/metal phosphonate generally lies in the range from about 0.1:1 to about 10:1, preferably from 0.2:1 to 5:1.

The amounts of each of the heat stabilizer and processing aids, when employed, can range from about 0.01 to about 1 weight percent based on the weight of the total composition, preferably from 0.05 to 0.5 weight percent.

The amount of organic phosphite, when employed, can range from about 0.02 to about 1 parts by weight per 100 parts by weight of polymer (php), preferably from 0.05 to 0.2 php.

The amount of colorant(s), when employed, is an amount effective to produce the determined shade of color. The amount of colorant(s) can range from about 0.0005 to about 5 weight percent based on the weight of the total composition, preferably from 0.01 to 2.5 weight percent.

The stabilizing systems of the present invention can be incorporated into the polymer in any conventional manner such as by dry blending the additive system directly with polymer pellets or fluff by means of tumble mixers, and Henschel blenders. Solutions or slurries of the stabilizers can be sprayed onto or admixed with a granular polymer. Stabilizers can also be blended with a molten polymer by means of a Banbury mixer, Brabender mixer, roll mill, or a screw extruder.

EXAMPLES

In the following examples, compositions were prepared by admixing the stated quantities of the specified hindered amine, when employed, and the specified metal phosphonate, when employed, with commercially available polypropylenes having nominal melt flows of 8 or 12 g/10 min (determined by the procedure of ASTM D 1238-88, Condition 230/2.16) and a melting point of about 170 C. The polypropylene contained 0.075 weight percent Ultranox 626 [bis(2,4-di-t-butylphenyl)pentaerythritol diphosphite/0.5-1.2 percent triisopropanolamine from GE], 0.075 weight percent Irganox 3114 [tris(3,5-di-t-butyl-4-hydroxybenzyl)isocyanurate from Ciba-Geigy], and 0.0375 weight percent Chimassorb 944 [N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine from Ciba-Geigy].

When pigments were used, one or more color concentrates containing the pigments were added to provide the required amount of pigment in the final composition. The amounts of pigments are expressed as a weight percent of the total final polymer blend. Pigments are identified by the Color Index Constitution number, when available.

When the additives were available as pellets, a pellet blend was prepared with polypropylene and pigment pellets. When the additives were available in powder or granule form, a blend was prepared from ground polypropylene and ground pigments. The resulting blends were melt extruded in an extruder at about 245° C. and melt spun at about 260° C. into 34 strand multifilament. After the undrawn multifilament had been drawn 4.75X at about 115° C. to produce an 18 denier per filament yarn, the yarn was knitted into a sleeve about 5 cm in diameter. Samples of the knitted sleeve were later cut to a convenient length for UV exposure.

The UV stability of the polypropylene samples was determined in an Atlas Ci65 high temperature xenon fadometer with a black panel temperature of about 89° C. and a relative humidity of about 50 percent. Each sample was mounted on a white mounting card and was periodically examined for degradation, usually about every 100 kj/m$^2$. Degradation is expressed as the amount of exposure (in terms of kj/m$^2$) required to weaken the fabric so that it was observed to flake when gently scratched with a fingernail or plastic needle. From multiple testing (see Example VII), samples should differ by more than about 200 kj/m$^2$ to be considered significantly different.

For convenience in the examples, the following designations are used for the hindered amines (HA);

| HA1 | Chimassorb 119 FL | Ciba-Geigy |
|---|---|---|
| HA2 | GR-3150 | B. F. Goodrich |
| HA3 | CS-6629 | B. F. Goodrich |
| HA4 | CS-7030 | B. F. Goodrich |
| HA5 | CS-7417 | B. F. Goodrich |
| HA6 | CS-7422 | B. F. Goodrich |
| HA7 | CS-7438 | B. F. Goodrich |
| HA8 | CS-7439 | B. F. Goodrich |
| HA9 | GR-X134 | B. F. Goodrich |
| HA10 | GR-X141 | B. F. Goodrich |
| HA11 | GR-X153 | B. F. Goodrich |
| HA12 | Topanex 500H | ICI |
| HA13 | 4650-104 | ICI |
| HA14 | 6218-004 | ICI |
| HA15 | 6305-121 | ICI |
| HA16 | Tinuvin 144 | Ciba-Geigy |
| HA17 | Chimassorb 944 | Ciba-Geigy |
| HA18 | Cyasorb UV 3346 | American Cyanamid |

In addition, these designations are used in the examples for the metal phosphonates (MP);

| MP1 = Irgastab 2002 | Ciba-Geigy |
|---|---|
| MP2 = Irganox 1425 | Ciba-Geigy |

Some specific examples of hindered amine stabilizers described above include:

substituted mono-melamine type compounds such as;
2,4,6-tri(N-cyclohexyl-N-(2-(3,3,5,5-tetramethyl-piperazinone)ethyl))-s-triazine (GR-3150 from B. F. Goodrich Co.) HA2;

2,4,6-tri(N-cyclohexyl-N-(3-(3,3,5,5-tetromethyl-piperazinone)propyl))-s-triazine (CS-6629 from B. F. Goodrich Co.) HA3;

substituted di-melamine compounds such as;
1,5,9-tri(6-(2-cyclohexylamine)-4-(1,1-dimethyl-3(3,3,5,5-tetramethylpiperidyl)) propylamino-s-triazine)1,5,9- triazanonane (CS-7438 from B. F. Goodrich) HA7; and 1,4,7-tri(6-(2-cyclohexylamine)-4-(1,1-dimethyl-2(3,3,5,5-tetramethylpiperidyl)) ethylamino-s-triazine)1,4,7-triazaheptane (GR-X134 from B. F. Goodrich) HA9;

substituted tri-melamine compounds such as;
CS-7030 (HA4), CS-7417 (HA5), CS7422 (HA6), CS-7439 (HA8), and GR-X141 (HA10), all from B. F. Goodrich; and

[4,4'-bis(2,2'-bis(N,N-dipropylamino)-6,6'-bis(N-(2-propyl)-N-(2-(3,3,5,5-tetramethyl piperizinone ethyl) s-triazine]1,4-piperazine (GR-X153 from B. F. Goodrich) HA11; and ether-substituted dipiperidinyl malonates such as; Topanex 500H (HA12), 4650-104 (HA13), 6219-004 (HA14), and 6305-121 (HA15) all from ICI, and Tinuvin 144 (HA 16) from-Ciba Geigy.

EXAMPLE I

A series of polypropylene fiber samples was prepared containing 0.75 weight percent Pigment Blue 15:1 (Color Index 74160), 0.0 or 0.4 weight percent nickel phosphonate, MP1, and 0.6 weight percent of one of a series of triazine based hindered amine stabilizers. Each composition was formed into knitted sleeves and tested for UV stability.

The UV degradation test results are summarized in Table I in terms of sets of blends with and without the MP1. In each set, the polypropylene fiber containing a combination of the hindered amine and MP1 was more stable to UV light than the corresponding sample without MP1. For example, sample 6 with HA3 and MP1 was more stable to the light exposure (degraded at 2098 kj/m$^2$) than control sample 5 with HA3 and no MP1 (degraded at 968 kj/m$^2$). Since the MP1 itself does not provide any significant UV protection (see Example X), the combination of additives is synergistic.

HA1, a poly-melamine with piperidinyl groups, was only slightly more effective at light stabilization with MP1 than without MP1. Hindered amine stabilizers HA2 and HA3, substituted mono-melamines, had large increases in the polypropylene fiber light stability with MP1 compared with the control fibers without MP1. HA4, HA5, HA6, HA8, HA10, AND HA11, all substituted di-melamines, also showed strong increases in the blue fiber light stability with MP1 compared with the control fibers. HA7 and HA9, substituted tri-melamine stabilizers, were much more effective for polypropylene light stabilization with MP1 than without MP1.

TABLE I

| | Polypropylene Degradation, Blue Pigment$^a$ | | |
|---|---|---|---|
| Sample No. | Stabilizer$^b$ at 0.6 Wt % | MP1$^b$, Wt % | Degraded, kj/M$^2$ |
| 1 | HA1 | 0.0 | 1420 |
| 2 | HA1 | 0.4 | 1756 |
| 3 | HA2 | 0.0 | 1493 |
| 4 | HA2 | 0.4 | 2626 |
| 5 | HA3 | 0.0 | 968 |
| 6 | HA3 | 0.4 | 2098 |
| 7 | HA4 | 0.0 | 840 |
| 8 | HA4 | 0.4 | 1575 |
| 9 | HA5 | 0.0 | 630 |
| 10 | HA5 | 0.4 | 1785 |
| 11 | HA6 | 0.0 | 1420 |
| 12 | HA6 | 0.4 | 1985 |
| 13 | HA7 | 0.0 | 525 |
| 14 | HA7 | 0.4 | 1575 |

TABLE I-continued

| Sample No. | Polypropylene Degradation, Blue Pigment[a] | | Degraded, kj/M² |
| --- | --- | --- | --- |
| | Stabilizer[b] at 0.6 Wt % | MP1[b], Wt % | |
| 15 | HA8 | 0.0 | 735 |
| 16 | HA8 | 0.4 | 1785 |
| 17 | HA9 | 0.0 | 840 |
| 18 | HA9 | 0.4 | 1365 |
| 19 | HA10 | 0.0 | 840 |
| 20 | HA10 | 0.4 | 1680 |
| 21 | HA11 | 0.0 | 630 |
| 22 | HA11 | 0.4 | 1890 |

[a] 0.75 wt % Pigment Blue 15:1.
[b] Additive designations are defined before Example I.

EXAMPLE II

In this example, another series of polypropylene fiber samples was prepared containing 0.75 weight percent Pigment Blue 15 (Color Index 74160), 0.0 or 0.4 weight percent MP1, and 0.6 weight percent of one of several substituted dipiperidinyl malonate hindered amine stabilizers. Several control or comparative samples are also included in this example. Each composition was processed into a knitted sleeve and tested for UV stability.

The results of the UV degradation studies are shown in Table II. HA12 and HA13 provide significant improvements in UV stability to polypropylene fiber containing a blue pigment and MP1 compared with the corresponding fiber without MP1. HA14 and HA15 do not provide substantial improvements in UV protection to the polypropylene fiber with MP1 compared with the corresponding control fiber without MP1. HA16 is a prior art, comparative stabilizer, n-butyl-(3,5-di-tert-butyl-4-hydroxybenzyl)bis-(1,2,2,6,6-pentamethyl-4-piperidinyl) malonate] that provides increased UV stability with MP1 and a blue pigment. HA17 and HA18 are other triazine additives (polymeric dipiperidinyl substituted mono-melamine compounds) that do not produce significant increases in UV stability of the blue pigmented polypropylene fiber with MP1.

TABLE II

| Sample No. | Polypropylene Degradation, Blue Pigment[a] | | Degraded, kj/m² |
| --- | --- | --- | --- |
| | Stabilizer[b] at 0.6 Wt % | MP1[b], Wt % | |
| 23 | HA12 | 0.0 | 630 |
| 24 | HA12 | 0.4 | 1365 |
| 25 | HA13 | 0.0 | 525 |
| 26 | HA13 | 0.4 | 1470 |
| 27 | HA14 | 0.0 | 630 |
| 28 | HA14 | 0.4 | 525 |
| 29 | HA15 | 0.0 | 420 |
| 30 | HA15 | 0.4 | 630 |
| 31 | HA16 | 0.0 | 1268 |
| 32 | HA16 | 0.4 | 2510 |
| 33 | HA17 | 0.0 | 1260 |
| 34 | HA17 | 0.4 | 1493 |
| 35 | HA18 | 0.0 | 1719 |
| 36 | HA18 | 0.4 | 1832 |

[a] 0.75 wt % Pigment Blue 15:1.
[b] Additive designations are defined before Example I.

EXAMPLE III

Another series of polypropylene fiber samples was prepared with 0.75 weight percent Pigment Violet 19 (Color Index 46500), 0.6 weight percent of a hindered amine, and 0.0 or 0.4 weight percent MP1. Each composition was formed into a knitted sleeve and tested for UV stability.

The test results from UV exposure of the knits (Table III) show that several samples containing both the hindered amine and MP1 gave improvements over samples without the MP1. For example, sample 44 (HA12 and MP1) degraded at 2205 kj/m² while sample 43 with HA12 only degraded at 1260 kj/m². Samples containing HA1, HA16, HA17, and HA18 with MP1 (samples 37, 52, 54, and 66) were not significantly improved over the corresponding samples without the MP1 in the presence of violet pigment.

TABLE III

| Sample No. | Polypropylene Degradation, Violet Pigment[a] | | Degraded, kj/m² |
| --- | --- | --- | --- |
| | Stabilizer[b] at 0.6 Wt % | MP1[b] Wt % | |
| 37 | HA1 | 0.0 | 2736 |
| 38 | HA1 | 0.4 | 2292 |
| 39 | HA2 | 0.0 | 1945 |
| 40 | HA2 | 0.4 | 2849 |
| 41 | HA3 | 0.0 | 1493 |
| 42 | HA3 | 0.4 | 2171 |
| 43 | HA12 | 0.0 | 1260 |
| 44 | HA12 | 0.4 | 2205 |
| 45 | HA13 | 0.0 | 945 |
| 46 | HA13 | 0.4 | 1470 |
| 47 | HA14 | 0.0 | 1260 |
| 48 | HA14 | 0.4 | 1785 |
| 49 | HA15 | 0.0 | 1785 |
| 50 | HA15 | 0.4 | 2205 |
| 51 | HA16 | 0.0 | 1832 |
| 52 | HA16 | 0.4 | 1945 |
| 53 | HA17 | 0.0 | 2623 |
| 54 | HA17 | 0.4 | 2171 |
| 55 | HA18 | 0.0 | 2171 |
| 56 | HA18 | 0.4 | 2171 |

[a] 0.75 wt % Pigment Violet 19.
[b] Additive designations are defined before Example I.

EXAMPLE IV

Another series of polypropylene fiber samples was prepared with 0.75 weight percent Pigment Red 144 (No Color Index number), 0.6 weight percent of a hindered amine, and 0.0 or 0.4 weight percent MP1. Each composition was formed into a knitted sleeve and tested for UV stability.

As shown in Table IV, the test results from UV exposure of the knitted samples show that only one hindered amine additive (HA6) had improved UV stability over the corresponding control fiber. Sample 64 degraded after 1832 kj/m² exposure while the control fiber 63 degraded after 1493 kj/m². Most of the hindered amines do not increase the UV stability of polypropylene fiber with this pigment.

TABLE IV

| Sample No. | Polypropylene Degradation, Red Pigment[a] | | Degraded kj/m² |
| --- | --- | --- | --- |
| | Stabilizer[b] at 0.6 Wt % | MP1[b] Wt % | |
| 57 | HA1 | 0.0 | 2058 |
| 58 | HA1 | 0.4 | 1832 |
| 59 | HA2 | 0.0 | 1945 |
| 60 | HA2 | 0.4 | 1945 |
| 61 | HA3 | 0.0 | 1606 |
| 62 | HA3 | 0.4 | 1719 |
| 63 | HA6 | 0.0 | 1493 |
| 64 | HA6 | 0.4 | 1832 |
| 65 | HA12 | 0.0 | 945 |
| 66 | HA12 | 0.4 | 1050 |
| 67 | HA13 | 0.0 | 1050 |
| 68 | HA13 | 0.4 | 1050 |

TABLE IV-continued

| Sample No. | Stabilizer[b] at 0.6 Wt % | MP1[b] Wt % | Degraded kj/m² |
|---|---|---|---|
| 69 | HA14 | 0.0 | 1470 |
| 70 | HA14 | 0.4 | 1260 |
| 71 | HA15 | 0.0 | 1050 |
| 72 | HA15 | 0.4 | 1050 |
| 73 | HA16 | 0.0 | 1493 |
| 74 | HA16 | 0.4 | 1493 |
| 75 | HA17 | 0.0 | 1832 |
| 76 | HA17 | 0.4 | 1832 |
| 77 | HA18 | 0.0 | 1493 |
| 78 | HA18 | 0.4 | 1493 |

Polypropylene Degradation, Red Pigment[a]

[a]0.75 wt % Pigment Red 144.
[b]Additive designations are defined before Example I.

EXAMPLE V

Another series of polypropylene fiber samples was prepared with 0.75 weight percent Pigment Yellow 83 (Color Index 21108), 0.6 weight percent of a hindered amine, and 0.0 or 0.4 weight percent MP1. Each composition was formed into a knitted sleeve and tested for UV stability.

The test result from the UV exposure (Table V) showed that none of the yellow fiber samples containing both the hindered amine additive and MP1 were significantly improved in UV stability over the control fiber with the hindered amine only.

TABLE V

| Sample No. | Stabilizer[b] at 0.6 Wt % | MP1[b] Wt % | Degraded, kj/m² |
|---|---|---|---|
| 79 | HA1 | 0.0 | 1155 |
| 80 | HA1 | 0.4 | 1050 |
| 81 | HA2 | 0.0 | 1163 |
| 82 | HA2 | 0.4 | 1050 |
| 83 | HA3 | 0.0 | 1493 |
| 84 | HA3 | 0.4 | 1493 |
| 55 | HA6 | 0.0 | 1381 |
| 86 | HA6 | 0.4 | 1155 |
| 77 | HA12 | 0.0 | 735 |
| 88 | HA12 | 0.4 | 735 |
| 89 | HA13 | 0.0 | 840 |
| 90 | HA13 | 0.4 | 1050 |
| 91 | HA14 | 0.0 | 1050 |
| 92 | HA14 | 0.4 | 1050 |
| 93 | HA15 | 0.0 | 840 |
| 94 | HA15 | 0.4 | 804 |
| 95 | HA16 | 0.0 | 1050 |
| 96 | HA16 | 0.4 | 945 |
| 97 | HA17 | 0.0 | 1155 |
| 98 | HA17 | 0.4 | 945 |
| 99 | HA18 | 0.0 | 1050 |
| 100 | HA18 | 0.4 | 840 |

Polypropylene Degradation, Yellow Pigment[a]

[a]0.75 wt % Pigment yellow 83.
[b]Additive designations are defined before Example I.

Another series of polypropylene fiber samples was prepared with 0.75 weight percent Pigment Orange 65 (No Color Index number), 0.6 weight percent of a hindered amine, and 0.0 or 0.4 weight percent MP1. Each composition was formed into a knitted sleeve and tested for UV stability.

The results (Table VI) from the UV testing show that only one of the hindered amines (HA15 in sample 116) with MP1 gave improved UV stability (3760 kj/m²) over the control fiber (sample 115) without MP1 (3150 kj/m²). The orange pigment appears to be acting as a stabilizer in these samples.

TABLE VI

| Sample No. | Stabilizer[b] at 0.6 Wt % | MP1[b] Wt % | Degraded, kj/m² |
|---|---|---|---|
| 101 | HA1 | 0.0 | 3527 |
| 102 | HA1 | 0.4 | 3588 |
| 103 | HA2 | 0.0 | 4312 |
| 104 | HA2 | 0.4 | 3522 |
| 105 | HA3 | 0.0 | 3745 |
| 106 | HA3 | 0.4 | 3416 |
| 107 | HA6 | 0.0 | 2738 |
| 108 | HA6 | 0.4 | 2510 |
| 109 | HA12 | 0.0 | 3045 |
| 110 | HA12 | 0.4 | 3150 |
| 111 | HA13 | 0.0 | 2940 |
| 112 | HA13 | 0.4 | 2940 |
| 113 | HA14 | 0.0 | 2940 |
| 114 | HA14 | 0.4 | 2940 |
| 115 | HA15 | 0.0 | 3150 |
| 116 | HA15 | 0.4 | 3760 |
| 117 | HA16 | 0.0 | 3183 |
| 118 | HA16 | 0.4 | 3278 |
| 119 | HA17 | 0.0 | 3302 |
| 120 | HA17 | 0.4 | 2738 |
| 121 | HA18 | 0.0 | 2841 |
| 122 | HA18 | 0.4 | 2510 |

Polypropylene Degradation, Orange Pigment[a]

[a]0.75 wt % Pigment Orange 65.
[b]Additive designations are defined before Example I.

EXAMPLE VII

A series of polypropylene fiber samples was prepared with no pigment (natural), 0.6 weight percent of a hindered amine, and 0.0 or 0.4 weight percent MP1. Each composition was formed into a knitted sleeve and tested for UV stability.

As shown in Table VII, only a few fiber samples made with combinations of hindered amines (HA3, HA12, and HA13) with MP1 gave significantly improved UV stabilization results over the corresponding control fibers without MP1. Several samples were retested two or three times to determine reproducibility of the test method. The results indicate that samples should differ by more than about 200 kj/m² to be considered significantly different.

TABLE VII

| Sample No. | Stabilizer[a] at 0.6 Wt % | MP1[a], Wt % | Degraded, kj/m² |
|---|---|---|---|
| 123 | None | 0.0 | 368 ± 74[b] |
| 124 | HA1 | 0.0 | 1809 ± 223[c] |
| 125 | HA1 | 0.4 | 2066 |
| 126 | HA2 | 0.0 | 1680 ± 182[c] |
| 127 | HA2 | 0.4 | 1680 |
| 128 | HA3 | 0.0 | 840 |
| 129 | HA3 | 0.4 | 1727 |
| 130 | HA12 | 0.0 | 1365 |
| 131 | HA12 | 0.4 | 1890 |
| 132 | HA13 | 0.0 | 1470 |
| 133 | HA13 | 0.4 | 1890 |
| 134 | HA14 | 0.0 | 1785 |
| 135 | HA14 | 0.4 | 1470 |
| 136 | HA15 | 0.0 | 1470 |
| 137 | HA15 | 0.4 | 1575 |
| 138 | HA16 | 0.0 | 1785 |
| 139 | HA16 | 0.4 | 1890 |
| 140 | HA17 | 0.0 | 1925 ± 219[c] |
| 141 | HA17 | 0.4 | 1575 |
| 142 | HA18 | 0.0 | 1943 ± 74[b] |
| 143 | HA18 | 0.4 | 1680 |

Polypropylene Degradation, No Pigments

[a]Additive designations are defined before Example 1.
[b]Average of two tests.
[c]Average of three tests.

EXAMPLE VIII

The results from Example I through VII are summarized here for easier comparisons. For each pigmented or natural set, the difference in degradation results (in kj/m$^2$) between the combination of hindered amine with MP1 and the hindered amine alone were calculated. A positive number indicates an increase in UV stability of the combination over the amine by itself. A negative number indicates a decrease in UV stability of the combination over the amine by itself. A zero means no change in stability. The results are shown in Table VIII.

Comparative compounds HA1, HA17, and HA18 were only slightly effective with MP1 in blue and ineffective in the other colors. Inventive stabilizers HA2 through HA15 produced significant increases in light stability with metal phophonate MP1 over samples without MP1.

TABLE VIII

| Stabi-lizer[b] | Stability Changes by Addition of MP1 | | | | | |
|---|---|---|---|---|---|---|
| | Change in Stability[a] with MP1[b], Δkj/m$^2$ | | | | | |
| | Blue | Violet | Red | Yellow | Orange | Natural |
| HA1 | +336 | −444 | −226 | −105 | +61 | 0 |
| HA2 | +1133 | +904 | 0 | +113 | −790 | +105 |
| HA3 | +1130 | +678 | +113 | 0 | −329 | +887 |
| HA4 | +735 | — | — | — | — | — |
| HA5 | +1155 | — | — | — | — | — |
| HA6 | +565 | — | +339 | −226 | −228 | — |
| HA7 | +1050 | — | — | — | — | — |
| HA8 | +1050 | — | — | — | — | — |
| HA9 | +525 | — | — | — | — | — |
| HA10 | +840 | — | — | — | — | — |
| HA11 | +1260 | — | — | — | — | — |
| HA12 | +735 | +945 | +105 | 0 | +105 | +325 |
| HA13 | +945 | +525 | 0 | +210 | 0 | +420 |
| HA14 | −105 | +525 | −210 | 0 | 0 | −315 |
| HA15 | +210 | +420 | 0 | −36 | +610 | +105 |
| HA16 | +1242 | +113 | 0 | −105 | +95 | +105 |
| HA17 | +233 | −452 | 0 | −210 | −564 | −525 |
| HA18 | +113 | 0 | 0 | −210 | −331 | −210 |

[a]Change in degradation time between sample without MP1 and sample with 0.4 wt % MP1.
[b]Additive designations are defined before Example I.

EXAMPLE IX

This example shows the effects of three different hindered amines with two metal phosphonates on the UV stability of polypropylene in the presence of several pigment combinations and without a pigment. The three hindered amines (HA2, HA12, and HA16) are used at the 0.60 weight percent level. A nickel phosphonate (MP1) and a calcium phosphonate (MP2) were used at 0.0 and 0.20 weight percent. Each set refers to three samples. For example, in the light brown set 144, the samples all contain 0.60 weight percent HA2 with either no metal phosponate, 0.20 weight percent MP1, or 0.20 weight percent MP2. The pigment combinations were:

| Color | Pigments | Color Index No. | Amounts, Wt % |
|---|---|---|---|
| Light Brown | Black 7 | 77266 | 0.023% |
| | Red 104 | 77605 | 0.100% |
| | Yellow 34 | 77603 | 0.211% |
| Gray | Blue 15:1 | 74160 | 0.018% |
| | Red 122 | 73915 | 0.015% |
| | Black 7 | 77266 | 0.063% |
| | White 6 | 77891 | 0.500% |
| Dark Red | Blue 15:1 | 74160 | 0.115% |
| | Red 179 | 71130 | 0.105% |
| | Red 101 | 77605 | 1.050% |
| Yellow | Yellow 34 | 77603 | 0.810% |
| | Yellow 110 | 56280 | 0.055% |
| | Black 7 | 77266 | 0.001% |
| Dark Brown | Black 7 | 77266 | 0.059% |
| | Yellow 110 | 56280 | 0.055% |
| | Violet 29 | 71129 | 0.068% |
| Dark Blue | Black 7 | 77266 | 0.220% |
| | Green 7 | 74260 | 0.425% |
| | Violet 23 | 51319 | 0.179% |
| Dark Green | Black 7 | 77266 | 0.063% |
| | Green 7 | 74260 | 0.180% |
| | Yellow 34 | 77603 | 1.400% |
| | Red 104 | 77605 | 0.417% |
| Natural | None | — | 0.000% |

Each composition was formed into knitted sleeves and tested for UV stability. The test results (Table IX) show that the combination of HA2 or HA12 with MP1 or MP2 does improve the UV stability of several of the pigmented polypropylene fiber samples. Light brown and yellow were not significantly improved by the combinations of additives. Dark brown is only marginally improved in light stability with the combination of additives. In the natural fibers, combinations of the hindered amines with MP2 were not improved over the control fiber without MP2. Especially strong improvements in UV stability with the hindered amine stabilizer and a metal phosphonate were noted in the dark red, dark blue, and dark green fiber samples.

TABLE IX

| | | | Polypropylene Degradation, Colors and Natural | | |
|---|---|---|---|---|---|
| Set No. | Color[a] | Stabilizer[b,c] | Degraded, kj/m$^2$ | | |
| | | | No MP | MP1[c,d] | MP2[c,d] |
| 144 | Light Brown | HA2 | 1582 | 1582 | 1582 |
| 145 | Light Brown | HA12 | 2373 | 2373 | 2373 |
| 146 | Light Brown | HA16 | 1130 | 1130 | 1130 |
| 147 | Gray | HA2 | 791 | 1356 | 1356 |
| 148 | Gray | HA12 | 904 | 1808 | 1694 |
| 149 | Gray | HA16 | 791 | 1130 | 904 |
| 150 | Dark Red | HA2 | 791 | 1808 | 1469 |
| 151 | Dark Red | HA12 | 791 | 1921 | 1469 |
| 152 | Dark Red | HA16 | 904 | 1695 | 1356 |
| 153 | Yellow | HA2 | 2599 | 2486 | 2486 |
| 154 | Yellow | HA12 | 2825 | 2599 | 2875 |
| 155 | Yellow | HA16 | 2373 | 2486 | 2486 |
| 156 | Dark Brown | HA2 | 904 | 1243 | 1243 |
| 157 | Dark Brown | HA12 | 1356 | 1582 | 1582 |
| 158 | Dark Brown | HA16 | 904 | 1130 | 1130 |
| 159 | Dark Blue | HA2 | 678 | 1695 | 1695 |
| 160 | Dark Blue | HA12 | 678 | 1356 | 1582 |
| 161 | Dark Blue | HA16 | 565 | 1356 | 1356 |
| 162 | Dark Green | HA2 | 904 | 1469 | 1582 |
| 163 | Dark Green | HA12 | 678 | 1808 | 1582 |
| 164 | Dark Green | HA16 | 904 | 1469 | 1582 |
| 165 | Natural | HA2 | 1695 | 1921 | 1469 |
| 166 | Natural | HA12 | 2373 | 2599 | 2486 |
| 167 | Natural | HA16 | 1695 | 1921 | 1695 |

[a]Pigment levels given in Example IX.
[b]0.60 wt % stabilizer.
[c]Additive designations are defined before Example I.
[d]0.20 wt % MP1 or MP2

EXAMPLE X

This example presents comparative samples to demonstrate that the metal phosphonates used in the present invention are not effective UV stabilizers in the absence of the hindered amines. Several polypropylene fiber samples were prepared with several pigment combinations and one natural together with 0.0 or 0.2 weight percent nickel phosphonate, MP1 or calcium phosphonate, MP2. The compositions were converted into knitted sleeves for UV exposure.

The results (Table X) show that there is essentially no increase in the stability of the knitted polypropylene sleeves when MP1 or MP2 was present without the hindered amine compared with samples made with no metal phosphonate.

TABLE X

| | | Polypropylene Degradation, No HALS | | |
|---|---|---|---|---|
| | | | Degradation, kj/m$^2$ | |
| Set No. | Color[a] | No MP | MP1[b], 0.2 Wt % | MP2[b], 0.2 Wt % |
| 168 | Light Brown | 452 | 339 | 339 |
| 169 | Gray | 339 | 339 | 339 |
| 170 | Dark Red | 339 | 565 | 425 |
| 171 | Yellow | 678 | 678 | 452 |
| 172 | Dark Brown | 339 | 339 | 339 |
| 173 | Dark Blue | 452 | 678 | 452 |
| 174 | Dark Green | 339 | 565 | 452 |
| 175 | Natural | 339 | 226 | 226 |

[a]Pigments described in Example IX.
[b]Additive designations are defined before Example I.

EXAMPLE XI

This example demonstrates the synergistic effect on UV stability of two hindered amines with MP1 in a dark blue polypropylene fiber. A series of polypropylene fiber samples was prepared with 0.119 weight percent Pigment Blue 15:1 (Color Index 74160), 0.121 weight percent Pigment Violet 19 (Color Index 46500), 0.6 weight percent either HA2 or HA12 with 0.0 or 0.2 weight percent MP1. The compositions were converted into knitted sleeves for UV exposure.

The test results are shown in Table XI. Significant increases in UV stability were noted for the fibers containing combinations of HA2 and HA12 with MP1 (samples 177 and 179) over the control fibers (samples 176 and 178) without the MP1.

TABLE XI

| | Polypropylene Degradation, Dark Blue Fiber[a] | | | |
|---|---|---|---|---|
| Sample No. | HA2[b], Wt % | HA12[b], Wt % | MP1[b], Wt % | Degraded, kj/m$^2$ |
| 176 | 0.6 | 0 | 0.0 | 1017 |
| 177 | 0.6 | 0 | 0.2 | 1921 |
| 178 | 0 | 0.6 | 0.0 | 904 |
| 179 | 0 | 0.6 | 0.2 | 1808 |

[a]0.119 wt % Pigment Blue 15:1. 0.121 wt % Pigment Violet 19.
[b]Additive designations are defined before Example I.

In summation, the specific examples show that the hindered amine/metal phosphonate stabilizing system is effective in colored compositions to provide unexpected resistance to UV light compared to either stabilizer alone at comparable concentrations. The stabilizing system is especially effective in blue and violet compositions. When a colorant is employed, optimum results can be obtained by adjusting the level of the stabilizer as required to compensate for the effect of the colorant on the system as is known in the art.

That which is claimed is:
1. A polymer composition comprising:
(a) polypropylene;
(b) at least one hindered amine selected from the group represented by the following formulas:
substituted di-melamine compounds represented by formula II,

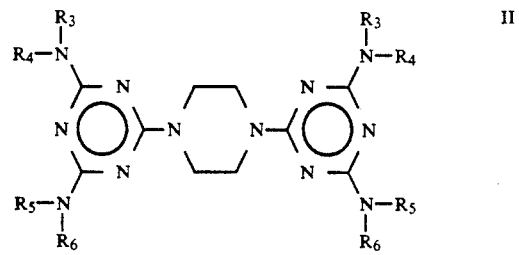

wherein $R_3$ is hydrogen, an alkyl group containing 1 to 10 carbon atoms, or a cycloalkyl group containing 3 to 12 carbon atoms, $R_4$ is a 1-alkylene piperazinone represented by formula A

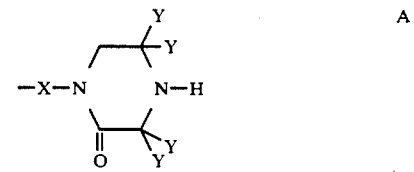

wherein
X is an alkylene group containing 1 to 6 carbon atoms and Y is an alkyl group containing 1 to 6 carbon atoms;
$R_5$ and $R_6$ are alkyl groups containing 1 to 6 carbon atoms or cycloalkyl groups containing 3 to 12 carbon atoms and can be the same or different, or can be taken together to form a single heterocyclic group containing 4 to 9 carbon atoms;
substituted tri-melamine compounds represented by the formula III,

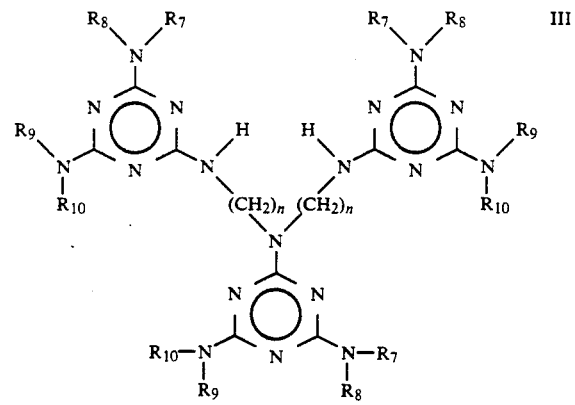

wherein
n is 1 to 4;
$R_7$, $R_8$, $R_9$, and $R_{10}$ can be the same or different and are hydrogen, alkyl groups containing 1 to 6 carbon atoms, cycloalkyl groups containing 3 to 12 carbon atoms, and at least one R group is a 1-alkylene piperazinone represented by formula A above, wherein X is an alkylene group containing 1 to 6 carbon atoms and y is an alkyl group containing 1 to 6 carbon atoms; and ether-substituted dipiperidinyl malonate compounds represented by formula IV,

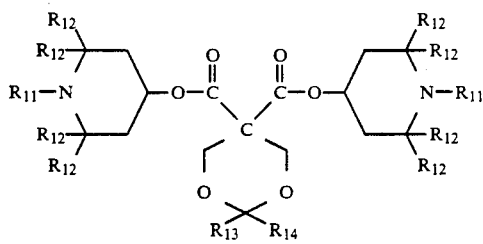

wherein $R_{11}$ is hydrogen or an alkyl group containing 1 to 6 carbon atoms;

$R_{12}$ ia an alkyl containing 1 to 6 carbon atoms; and $R_{13}$ and $R_{14}$ can be the same or different, and are hydrogen or an alkyl group containing 1 to 12 carbon atoms, or taken together to form a single cycloalkyl containing 3 to 20 carbon atoms; and (c) at least one metal phosphonate selected from the group represented by the formula V,

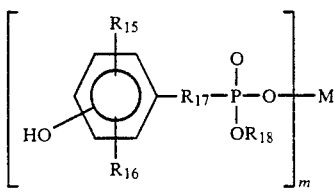

wherein m is 1–3;

$R_{15}$ is an alkyl group having from 1 to 6 carbon atoms;

$R_{16}$ is hydrogen or an alkyl group having from 1 to 6 carbon atoms;

$R_{17}$ is an alkylene radical having from 1 to 4 carbon atoms;

$R_{18}$ is hydrogen or an alkyl having from 1 to 30 carbon atoms; and

M is a metal selected from the group consisting of aluminum, barium, cadmium, calcium, chromium, cobalt, nickel, sodium, tin, and zinc;

wherein said hindered amine and said metal phosphonate are present in an amount effective to provide ultraviolet stabilization.

2. A composition according to claim 1 further comprising at least one phenolic heat stabilizer in an amount effective to provide heat stabilization.

3. A composition according to claim 2 further comprising at least one organic phosphite in an amount effective to provide stabilization.

4. A composition according to claim 3 further comprising at least one colorant in an amount effective to produce a colored composition.

5. A composition according to claim 4 wherein
said hindered amine is present in an amount in the range of from about 0.05 to about 5 weight percent based on the weight of the total composition;
said metal phosphonate is present in an amount in the range of from about 0.05 to about 5 weight percent based on the weight of the total composition; and
the weight ratio of said hindered amine to said metal phosphonate is in the range of from about 0.1:1 to 10:1;
said phenolic heat stabilizer is present in an amount in the range of from about 0.01 to about 1 weight percent based on the weight of the total composition;
said organic phosphite is present in an amount in the range of from about 0.02 to about 1 parts per hundred parts of polymer; and
said colorant is present in an amount in the range of from about 0.0005 to about 5 weight percent based on the weight of the total composition.

6. A composition according to claim 5, wherein said metal in said metal phosphonate is selected from the group consisting of nickel or calcium;
said phenolic heat stabilizer is a hydroxyphenylalkenyl isocyanurate; and
said organic phosphate is an organic diphosphite.

7. A composition according to claim 6 wherein said hindered amine is of the substituted di-melamine type represented by formula II, wherein
$R_3$ is hydrogen, 1-propyl, 2-octyl, or cyclohexyl;
$R_4$ is represented by formula A, wherein X is ethylene, propylene, or 1,1-dimethylethylene and Y is methyl;
$R_5$ and $R_6$ can be the same or different, and are ethyl, butyl, or cyclhexyl groups or can be taken together to form a 1-piperidinyl group;
said metal phosphonate is nickel bis(O-ethyl-3,5,-di-t-butyl-4-hydroxybenzylphosphonate); and
said colorant is a blue or red pigment.

8. A composition according to claim 6 wherein said hindered amine is of the substituted tri-melamine type represented by formula III, wherein
n=2 or 3;
$R_7$, $R_8$, and $R_9$ are cyclohexyl or hydrogen groups;
$R_{10}$ is a 1-alkylene piperazinone represented by formula A, wherein X is ethylene or 1,1-dimethylethylene and Y is methyl;
said metal phosphonate is nickel bis(O-ethyl-3,5,-di-t-butyl-4-hydroxybenzylphosphonate); and
said colorant is a blue pigment.

9. A composition according to claim 6 wherein said hindered amine is of the ether-substituted dipiperidinyl malonate type represent by formula IV, where
$R_{11}$ is hydrogen;
$R_{12}$ is methyl; and
$R_{13}$ is hydrogen, and $R_{14}$ is a heptyl group, or
$R_{13}$ and $R_{14}$ are taken together to form a cyclohexyl group;
said metal phosphonate is nickel bis(O-ethyl-3,5-di-t-butyl-4-hydroxybenzylphosphonate) or calcium bis(O-ethyl-3,5-di-t-butyl-4-hydroxybenzylphosphonate); and
said colorant is a blue, violet, orange, gray, red or green pigment.

10. A polymer composition comprising:
(a) polypropylene
(b) a hindered amine of the substituted di-melamine type represented by formula II,

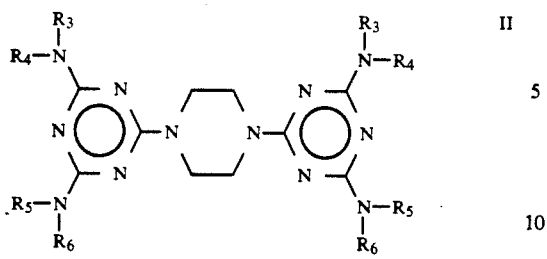

wherein $R_3$ is hydrogen, 1-propyl, 2-octyl, or cyclohexyl;

$R_4$ is represented by formula A, wherein X is ethylene, propylene, or 1,1-dimethylethylene and Y is methyl;

$R_5$ and $R_6$ can be the same or different, and are ethyl, butyl, or cyclohexyl groups or can be taken together to form a 1-piperidinyl group;

(c) a metal phosphonate, nickel bis(O-ethyl-3,5,-di-t-butyl-4-hydroxybenzylphosphonate); and (d) a colorant selected from blue or red pigment;

wherein said hindered amine and said metal phosphonate are present in an amount effective to provide ultraviolet stabilization.

11. A polymer composition comprising:
(a) polypropylene
(b) a hindered amine of the substituted tri-melamine type represented by formula III,

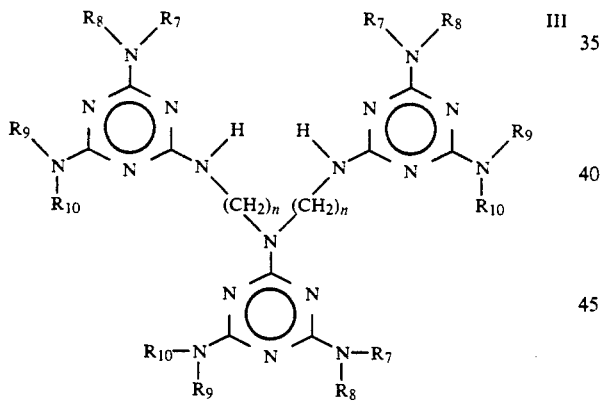

wherein n = 2 or 3;

$R_7$, $R_8$, and $R_9$ are cyclohexyl or hydrogen groups;

$R_{10}$ is a 1-alkylene piperazinone represented by formula A, wherein X is ethylene or 1,1-dimethylethylene and Y is methyl;

(c) a metal phosphonate, nickel bis(O-ethyl-3,5,-di-t-butyl-4-hydroxybenzylphosphonate); and (d) a colorant selected from blue pigment wherein said hindered amine and said metal phosphonate are present in an amount effective to provide ultraviolet stabilization.

12. A polymer composition comprising:
(a) polypropylene
(b) a hindered amine of the ether-substituted dipiperidinyl malonate type represented by formula IV,

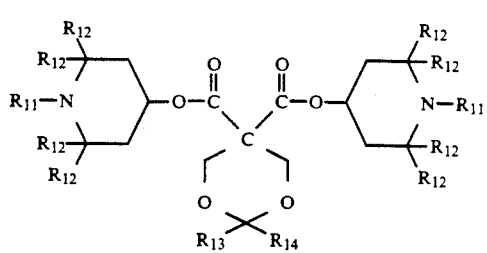

wherein $R_{11}$ is hydrogen, $R_{12}$ is methyl;

$R_{13}$ is hydrogen, and $R_{14}$ is a trimethylene group connecting two ether-substituted dipiperidinyl groups or a heptyl group. or $R_{13}$ and $R_{14}$ are taken together for form a cyclohexyl group or a 2,2,6,6-tetramethyl-4-piperidinyl group;

(c) a metal phosphonate selected from nickel bis(O-ethyl-3,5,-di-t-butyl-4-hydroxybenzylphosphonate) or calcium bis(O-ethyl-3,5,-di-t-butyl-4-hydroxybenzylophosphonate); and (d) a colorant selected from blue, violet, orange, gray, red, or green pigment;

wherein said hindered amine and said metal phosphonate are present in an amount effective to provide ultraviolet stabilization.

13. A composition according to claim 12 wherein said colorant is blue or violet.

14. A polymer composition comprising:
(a) polypropylene
(b) a hindered amine of the ether-substituted dipiperidinyl malonate type represented by formula IV,

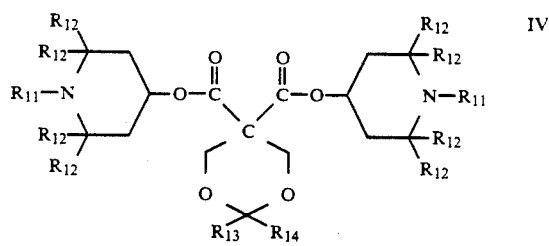

wherein $R_{11}$ is hydrogen, $R_{12}$ is methyl; and $R_{13}$ and $R_{14}$ taken together form a cyclohexyl group or a 2,2,6,6-tetramethyl-4-piperidinyl group; and (c) a metal phosphonate selected from nickel bis(O-ethyl-3,5,-di-t-butyl-4-hydroxybenzylphosphonate) or calcium bis(O-ethyl-3,5,-di-t-butyl-4-hydroxybenzylphosphonate);

with the proviso that no colorant is present;

wherein said hindered amine and said metal phosphonate are present in an amount effective to provide ultraviolet stabilization.

15. A polymer composition comprising:
(a) a polypropylene;
(b) a hindered amine of the substituted di-melamine type represented by formula II,

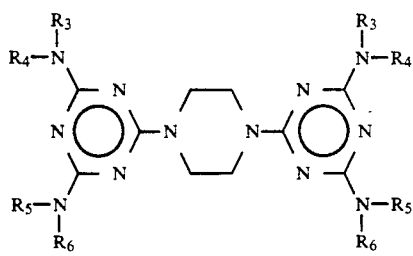

II wherein

R$_3$ is hydrogen, 1-propyl, 2-octyl, or cyclohexyl;

R$_4$ is a 1-alkylene piperazinone represented by formula A, wherein X is ethylene, propylene, or 1,1-dimethylethylene and Y is methyl,

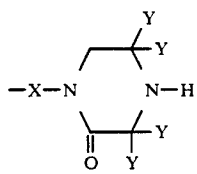

A

R$_5$ and R$_6$ can be the same or different and are ethyl, butyl or cyclohexyl groups or taken together to form a 1-piperidinyl group;

(c) a metal phosphonate comprising nickel bis(O-ethyl-3,5-di-t-butyl-4-hydroxybenzylphosphonate);

(d) a phenolic beat stabilizer comprising tris-(3,5-di-t-butyl-4-hydroxybenzyl)isocyanurate;

(e) an organic diphosphite comprising bis(2,4-di-t-butylphenyl)pentaerythritol diphosphite/0.5–1.2 percent triisopropanolamine; and (f) a colorant selected from blue and red pigments;

wherein said hindered amine is present in an amount in the range of from 0.05 to 2 weight percent based on the weight of the total composition;

said metal- phosphonate is present in an amount in the range of from 0.05 to 2 weight percent based on the weight of the total composition; and the weight ratio of said hindered amine to said metal phosphonate is in the range of from 0.2:1 to 5:1;

said phenolic beat stabilizer is present in an amount in the range of from 0.05 to 0.5 weight percent of the weight of the total composition;

said organic phosphite is present in an amount in the range of from 0.05 to 0.2 parts per hundred parts polymer; and said colorant is present in an amount in the range of from 0.01 to 2.5 weight percent of the weight of the total composition.

16. A composition according to claim 15 wherein said colorant is phthalocyanine blue pigment.

17. A composition according to claim 15 wherein said hindered amine is represented by formula II;

wherein R$_3$ is hydrogen;

R$_4$ is a 1-alkylene piperazinone represented by formula A, wherein X is 1,1-dimethylethylene and Y is methyl;

R$_5$ and R$_6$ are butyl groups; and said colorant is red pigment.

18. A polymer composition comprising:

(a) polypropylene;

(b) a hindered amine of the substituted tri-melamine type represented by the formula III,

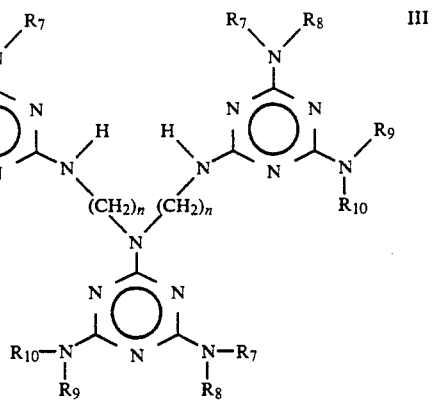

III wherein n=2 or 3;

R$_7$, R$_8$, and R$_9$ individually are hydrogen or cyclohexyl; and

R$_{10}$ is a 1-alkylene piperazinone represented by formula A, wherein X is ethylene or 1,1-dimethylethylene and Y is methyl;

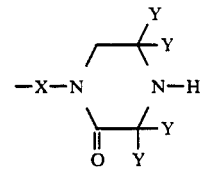

A (c) a metal phosphonate comprising nickel bis(O-ethyl-3,5,-di-t-butyl-4-hydroxybenzylphosphonate);

(d) a phenolic heat stabilizer comprising tris-(3,5-di-t-butyl-4-hydroxybenzyl)isocynnurate;

(e) an organic diphosphite comprising bis(2,4-di-t-butylphenyl)pentaerythritol diphosphite/0.5–1.2 percent triisopropanolamine; and (f) a blue colorant;

wherein said hindered amine is present in an amount in the range of from 0.05 to 2 weight percent based on the weight of the total composition;

said metal phosphonate is present in an amount in the range of from 0.05 to 2 weight percent based on the weight of the total composition; and the weight ratio of said hindered amine to said metal phosphonate is in the range of from 0.2:1 to 5:1;

said phenolic heat stabilizer is present in an amount in the range of from 0.05 to 0.5 weight percent based on the weight of the total composition;

said organic phosphite is present in an amount in the range of from 0.05 to 0.2 parts per hundred parts polymer; and said colorant is present in an amount in the range of from 0.01 to 2.5 weight, percent based on the weight of the total composition.

19. A composition according to claim 18 wherein said colorant is phthalocyanine blue pigment.

20. A polymer composition comprising:

(a) polypropylene;

(b) a hindered amine of the ether-substituted dipiperidinyl malonate type represented by the formula IV,

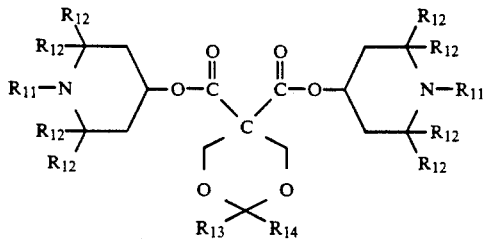

wherein $R_{121}$ is hydrogen;

$R_{12}$ is methyl; and $R_{13}$ is hydrogen and $R_{14}$ is a heptyl group or $R_{13}$ and $R_{14}$ taken together are a cyclohexyl group or a piperidinyl group;

(c) a metal phosphonate selected from calcium bis(O-ethyl-3,5,-di-t-butyl-4-hydroxybenzylphosphonate) or nickel bis(O-ethyl-3,5,-di-t-butyl-4-hydroxybenzylphosphonate);

(d) a phenolic heat stabilizer comprising tris-(3,5-di-t-butyl-4-hydroxybenzyl)isocyanurate; and (e) an organic diphosphite comprising bis(2,4-di-t-butylphenyl)pentaerythritol diphosphite/0.5–1.2 percent triisopropanolamine;

wherein said hindered amine is present in an amount in the range of from 0.05 to 2 weight percent based on the weight of the total composition; said metal phosphonate is present in an amount in the range of from 0.05 to 2 weight percent based on the weight of the total composition; and the weight ratio of said hindered amine to said metal phosphonate is in the range of from 0.2:1 to 5:1;

said phenolic heat stabilizer is present in an amount in the range of from 0.05 to 0.5 weight percent based on the weight of the total composition; and said organic phosphite is present in an amount in the range of from 0.05 to 0.2 parts per hundred parts polymer.

21. A composition according to claim 20 further comprising a colorant selected from blue, violet, orange, gray, red, and green pigments;

wherein said colorant is present in an amount in the range of from 0.01 to 2.5 weight percent based on the weight of the total composition.

22. A composition according to claim 21 wherein said colorant is violet pigment.

23. A composition according to claim 21 wherein said hindered amine is represented by the formula IV, wherein $R_{11}$ is hydrogen;

$R_{12}$ methyl, and $R_{13}$ and $R_{14}$ are taken together to form cyclohexyl or 2,2,6,6-tetramethylpiperidine; and said colorant is phthalocyanine blue pigment.

24. A composition according to claim 21 wherein said hindered amine is represented by the formula IV, wherein $R_{11}$ is hydrogen;

$R_{12}$ is methyl; and $R_{13}$ is hydrogen; and $R_{14}$ is 3-heptyl; and said colorant is orange or violet pigment.

* * * * *

UNITED STATES PATENT AND TRADEMARK OFFICE
CERTIFICATE OF CORRECTION

PATENT NO. : 5,310,771
DATED : May 10, 1994
INVENTOR(S) : John P. Walters

It is certified that error appears in the above-identified patent and that said Letters Patent is hereby corrected as shown below:

Column 23, line 46, claim 15, delete "beat" and insert --- heat --- therefor.

Column 25, line 14, claim 20, delete "$R_{121}$" and insert --- $R_{11}$ --- therefor.

Signed and Sealed this

Ninth Day of August, 1994

Attest:

BRUCE LEHMAN

Attesting Officer

Commissioner of Patents and Trademarks